Figure 1:
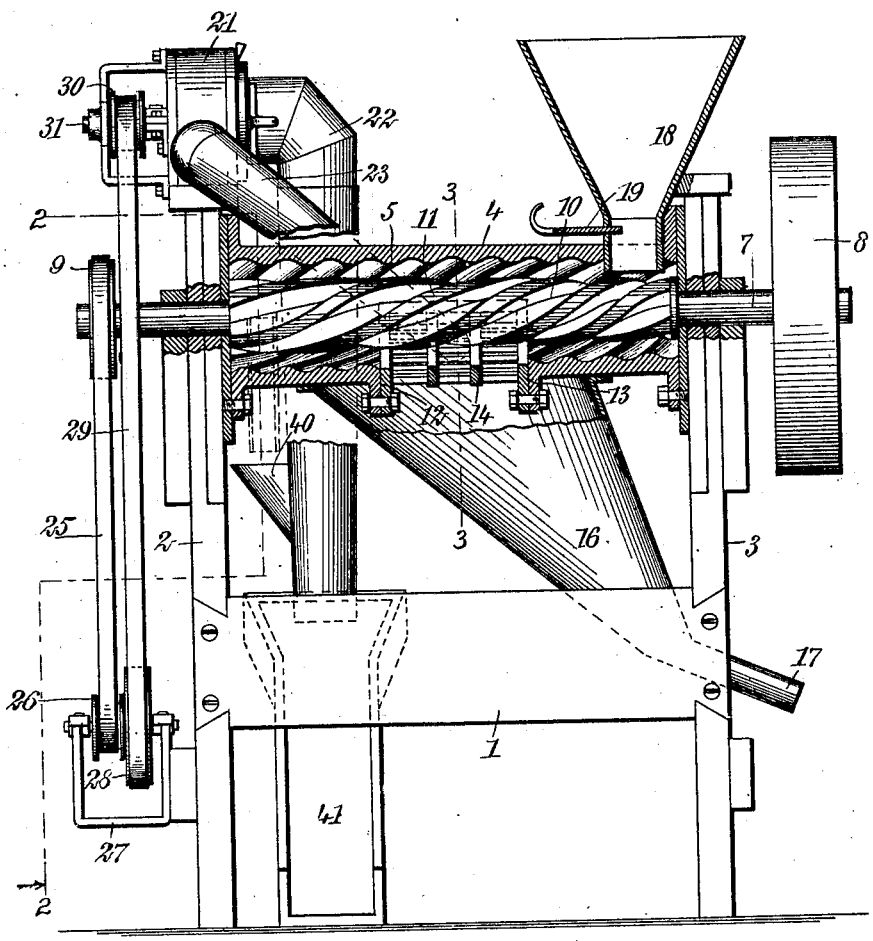

No. 871,045. PATENTED NOV. 12, 1907.
E. C. PRIETO.
RETHRESHER AND POLISHER FOR COFFEE.
APPLICATION FILED DEC. 29, 1905.

2 SHEETS—SHEET 1.

WITNESSES:

INVENTOR
Eudoro C. Prieto
BY
ATTORNEYS

No. 871,045. PATENTED NOV. 12, 1907.
E. C. PRIETO.
RETHRESHER AND POLISHER FOR COFFEE.
APPLICATION FILED DEC. 29, 1905.
2 SHEETS—SHEET 2.
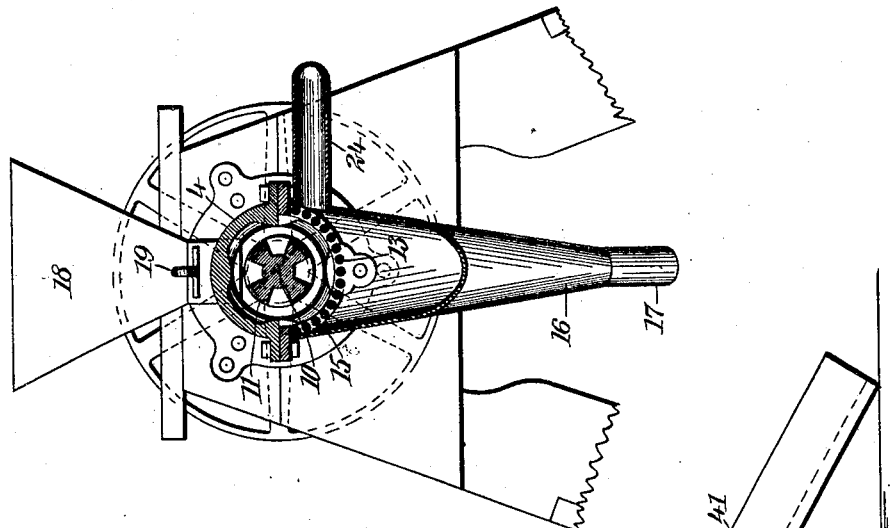
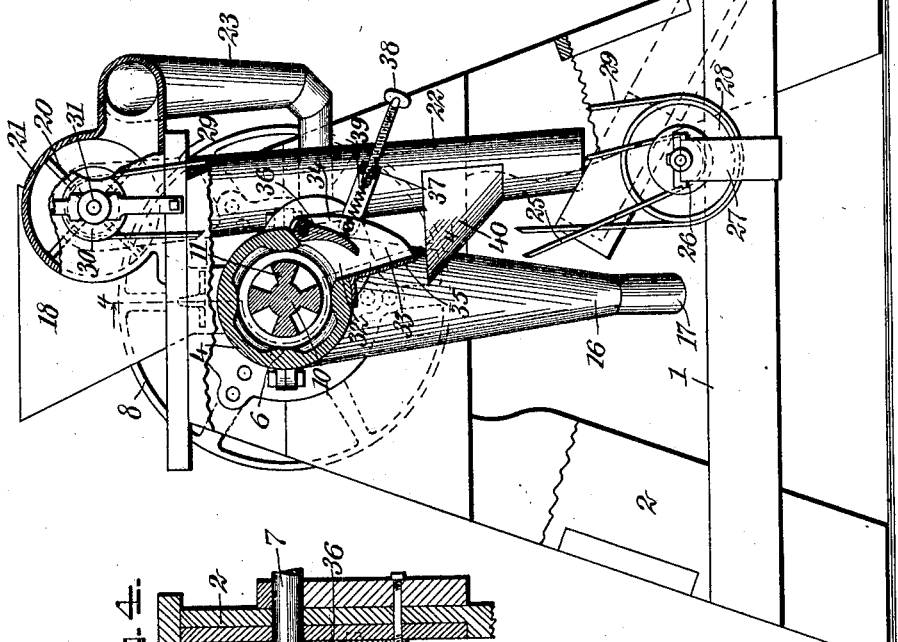
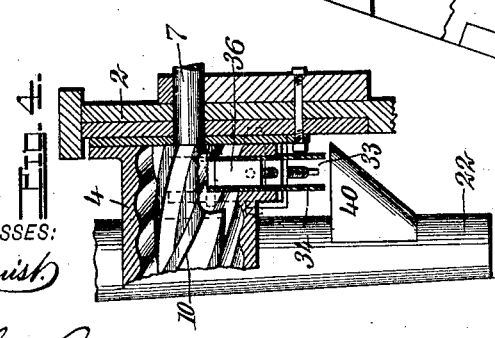
WITNESSES:
L. Almquist
F. A. Ammen
INVENTOR
Eudoro C. Prieto
BY
ATTORNEYS

UNITED STATES PATENT OFFICE.

EUDORO C. PRIETO, OF CIPAQUIRA, COLOMBIA.

RETHRESHER AND POLISHER FOR COFFEE.

No. 871,045.

Specification of Letters Patent.

Patented Nov. 12, 1907.

Application filed December 29, 1905. Serial No. 293,871.

*To all whom it may concern:*

Be it known that I, EUDORO C. PRIETO, a citizen of the Republic of Colombia, and a resident of Cipaquira, Departmenta de Cundinamarca, Colombia, South America, have invented a new and Improved Rethresher and Polisher for Coffee, of which the following is a full, clear, and exact description.

This invention relates to machines for treating grain such as coffee, for the purpose of improving its quality and effecting a very complete elimination of the chaff or bran.

The object of the invention is to produce a machine for this class having improved means for subjecting the coffee grain or bean to a rubbing or polishing action, and to improve the means for subjecting the same to an air current during this polishing process, for the purpose of separating out chaff or bran; a further object to provide improved means for regulating the degree of pressure to which the grain is subjected during the polishing process.

The invention consists in the construction and combination of parts to be more fully described hereinafter, and to be more definitely set forth in the claims.

Reference is to be had to the accompanying drawings forming a part of this specification, in which similar characters of reference indicate corresponding parts in all the figures.

Figure 1 is substantially a side elevation of the machine, showing the barrel thereof and contiguous parts in section, certain other parts being broken away as will appear: Fig. 2 is substantially an end elevation of the machine, the barrel thereof being shown in cross-section; this view is taken on the line 2—2 of Fig. 1; Fig. 3 is a cross-section taken on the line 3—3 of Fig. 1 and illustrating especially the construction at the point where the principal separation of the bran is effected; and Fig. 4 is a cross-section on the line 4—4 of Fig. 2, and illustrating especially the device for regulating the pressure upon the grain during the polishing process.

Referring more particularly to the parts, 1 represents the frame of the machine, which preferably comprises a pair of oppositely-disposed A-frames 2 and 3, between which there is rigidly supported a barrel 4. As indicated, this barrel is preferably of substantially cylindrical form, slightly enlarged at one extremity and disposed upon a horizontal axis. The inner wall of this barrel is formed with helical corrugations or ribs 5, which preferably present rounded or convex outer faces 6, as indicated most clearly in Fig. 2. Mounted centrally in the barrel 4 I provide a shaft 7, which projects at the right extremity as indicated in Fig. 1, at which point a belt pulley 8 is rigidly attached as shown. Upon the opposite extremity of the shaft 7 which also projects, a small belt pulley 9 is attached rigidly for a purpose which will appear more clearly hereinafter. Upon the body of the shaft 7, within the barrel 4, a drum or bur 10 is placed, the same consisting of a tapered body having the general form of a cylinder, but formed with helical ribs 11, preferably four in number as indicated. The form of this bur is most clearly shown in Fig. 2; as indicated in that figure the ribs 11 are preferably widest at their outer surfaces, that is, they taper inwardly so as to diminish in thickness toward the axis of the shaft 7. Preferably at substantially the middle point of this barrel 4, the inner side thereof is formed with an opening 12, in which a grating 13 is rigidly secured, said grating preferably comprising a frame 14 of substantially rectangular form, which frame carries a plurality of longitudinally-disposed bars 15. These bars are preferably disposed circumferentially, as indicated most clearly in Fig. 3, so as to constitute a continuation of the cylindrical outline of the barrel. They are preferably of round form and disposed slightly apart, as indicated, completely inclosing the opening 12 and grating 13. I provide a chute 16, which chute is preferably of enlarged dimensions at its upper extremity, as indicated most clearly in Fig. 1. In addition to tapering in the manner suggested, this chute is also inclined, preferably toward the right, as indicated in Fig. 1; terminating below in a delivery-nozzle 17.

At the right end of the barrel 4 which is of smaller diameter, an inlet opening is provided on its upper side, at which point a feed-hopper 18 is arranged as shown, and the outlet from this hopper is controlled by means of a sliding shutter 19 of any suitable construction.

At a suitable point on the A-frame 2, there is attached a blower or fan 20, the same being preferably inclosed in a suitable casing 21, having a substantially vertical in-take 23. The construction of this in-take will be more fully described hereinafter. This blower 20 is for the purpose of forcing air through the barrel 4 at the grating 13. For this purpose an air-pipe 23 leads down from the casing 21 in an inclined direction, terminating in a horizontal delivery-nozzle 24, as indicated most clearly in Fig. 3. This nozzle communicates with the interior of the aforesaid chute 16 at the upper portion thereof and substantially on a line with the grate bars 15 described above; this arrangement is very clearly shown in Fig. 3. Arrangement is made for driving this fan continuously. For this purpose a belt 25 is provided, which passes over the aforesaid pulley 9 and leads to a pulley 26 of smaller diameter, the latter pulley being mounted in a suitable bracket 27 which is attached at a suitable point to the frame 1. Rigid with the pulley 26 there is a second pulley 28 of larger diameter, and this pulley 28 is connected by a suitable belt 29 with a small pulley 30 carried rigidly by the shaft 31 of the fan 20. From this arrangement, when the machine is in operation the fan is driven at a high rotative velocity.

It should be understood that when the machine is in operation, the coffee which is fed through the hopper 18 moves progressively toward the end of the barrel remote from the hopper and toward the left end of the machine as viewed in Fig. 1. At this point there is a delivery-opening 32, preferably near the bottom and disposed slightly to one side, as indicated most clearly in Fig. 2. In this opening 32 there is attached a delivery-spout 33, presenting oppositely-disposed side walls 34, and a bottom-wall or web 35 connecting these side walls. Between the walls 34 of this spout there is pivotally attached a shutter 36, which is preferably slightly curved as shown, projecting down in an inclined direction, so as to partially close the outlet-opening 32. In this arrangement it will be seen that the lower edge of the shutter normally lies adjacent to the bottom 35 of the spout. It should be understood that during the operation of the machine the grain finds outlet at this point. I provide means for resiliently holding this shutter 36 in position. For this purpose the spout is provided with a suitable bracket 37, having an adjusting screw 38 which advances when turned, in the direction of the shutter. Between the extremity of this adjusting screw and the shutter I provide a compression-spring 39; evidently by screwing this adjusting screw inwardly the degree of restriction of the opening or outlet 32 will be increased, and vice versa.

Referring again to the intake 22, I provide the lower portion thereof with a laterally-projecting receiver or rudimentary chute 40, which is depressed just below the spout 33. From this arrangement the grain which is delivered through the spout 33 passes through the lower extremity of the intake. Below the intake I provide a trough 41, into which the intake delivers the grain which is received from the receiver 40. This trough 41 is used for the purpose of filling receptacles for the grain which has been treated in the machine.

The mode of operation of the machine will now be described: As intimated above, the coffee grain or berries are fed into the hopper 18. As the drum 10 rotates, this grain is advanced toward the delivery end of the machine, and during this process the grain is constantly rubbed by the ribs of the drum and by the ribs of the barrel, in this way the surface of the grain is polished, and any particles of chaff or bran which adhere thereto will be detached. The grain is of course forced through the spout 33 by the rotation of the drum, it being understood that the drum constitutes virtually a conveyer. By reason of the shutter 36 the outlet 32 is restricted or choked, and in this way, before being delivered from the machine the grain is subjected to considerable pressure as it is rubbed by the faces of the drum or the barrel. Evidently, by adjusting the screw 38 the pressure of the spring 39 upon the shutter 36 may be nicely regulated, in this way regulating the pressure existing throughout the mass of the grain within the barrel. As the grain is passing the opening 12 and the grating 13 it is subjected to a violent blast of air from the blower, which is delivered by the nozzle 24, the said blast passing between the grate-bars 15. In this way the light particles of chaff or bran which are carried with the grain are separated out and advanced to the chute 16. This air-blast has the effect also of drying the grain and cooling the same, it being understood that the grain becomes more or less heated from its frictional contact with the surrounding walls. If any chaff or bran should not be removed by the air-blast at the nozzle 24, this chaff will be removed by the upward current of air which flows in the intake 22 when the treated grain is delivered into the same from the receiver 40. In this way the grain is treated twice to an air-blast.

Having thus described my invention, I claim as new and desire to secure by Letters Patent:

A machine of the class described, comprising, in combination, a barrel having a roughened inner surface, a rotatable drum having helical ribs mounted therein and adapted to advance grain in said barrel, a grating presenting longitudinally-disposed bars in the wall of said barrel and arranged circumferentially with respect to the axis thereof, a blower, means for guiding a current of air through said grating, an outlet opening in said barrel, a chute communicating with said outlet opening, and means for delivering an air-blast at said chute.

In testimony whereof I have signed my name to this specification in the presence of two subscribing witnesses.

EUDORO C. PRIETO.

Witnesses:
SAM B. KOPPEL,
EFRAIM MONTALNOE.